(12) United States Patent
Hinton et al.

(10) Patent No.: US 12,002,290 B2
(45) Date of Patent: Jun. 4, 2024

(54) SYSTEMS AND METHODS FOR HYBRID EDGE/CLOUD PROCESSING OF EYE-TRACKING IMAGE DATA

(71) Applicant: EyeTech Digital Systems, Inc., Mesa, AZ (US)

(72) Inventors: Caleb Robert Hinton, Mesa, AZ (US); Miles Kirkland Manning, Gilbert, AZ (US); Robert Jacob Nelson, Gilbert, AZ (US)

(73) Assignee: EYETECH DIGITAL SYSTEMS, INC., Mesa, AZ (US)

( * ) Notice: Subject to any disclaimer, the term of this patent is extended or adjusted under 35 U.S.C. 154(b) by 0 days.

(21) Appl. No.: 17/680,998

(22) Filed: Feb. 25, 2022

(65) Prior Publication Data
US 2023/0274578 A1    Aug. 31, 2023

(51) Int. Cl.
  *G06V 40/00* (2022.01)
  *G06V 40/19* (2022.01)
  *H04N 23/56* (2023.01)
  *H04N 23/60* (2023.01)

(52) U.S. Cl.
  CPC ............. *G06V 40/19* (2022.01); *H04N 23/56* (2023.01); *H04N 23/64* (2023.01)

(58) Field of Classification Search
  CPC ......... G06V 40/19; H04N 23/56; H04N 23/64
  See application file for complete search history.

(56) References Cited

U.S. PATENT DOCUMENTS

| | | | |
|---|---|---|---|
| 5,367,315 A | 11/1994 | Pan | |
| 7,572,008 B2 | 8/2009 | Elvesjo et al. | |
| 7,884,977 B2 * | 2/2011 | Mori | H04N 19/12 358/538 |
| 8,086,044 B2 * | 12/2011 | Feng | H04N 19/176 382/220 |
| 8,350,889 B1 | 1/2013 | Shammoh | |
| 8,878,773 B1 * | 11/2014 | Bozarth | G06V 10/143 382/103 |
| 9,185,352 B1 | 11/2015 | Jacques | |

(Continued)

OTHER PUBLICATIONS

Gunawardena et al. Performance Analysis of CNN Models for Mobile Device Eye Tracking with Edge Computing, Procedia Computer Sciencevol. 207Issue C01 Jan. 2022 pp. 2291-2300https://doi.org/10.1016/j.procs.2022.09.288.*

(Continued)

*Primary Examiner* — Frank F Huang
(74) *Attorney, Agent, or Firm* — Quarles & Brady LLP

(57) ABSTRACT

Systems and methods provide for intelligently switching between cloud processing mode and edge processing mode based on a variety of criteria, such as the desired eye-tracker settings (e.g., minimum tracker rate, ideal tracker rate, and processing mode) and the available network capabilities (e.g., latency, bandwidth, and the like). The criteria used for determining whether buffered cloud processing is viable include such parameters as upload bandwidth, tolerable processing delay, buffer drain rate, buffer fill rate, and maximum session duration. The cloud processing system may be used instead of available edge processing in cases where there are benefits to doing so, e.g., the cloud processing system provides added functionality, such as improved data analytics.

15 Claims, 3 Drawing Sheets

(56) References Cited

U.S. PATENT DOCUMENTS

Figure 1:
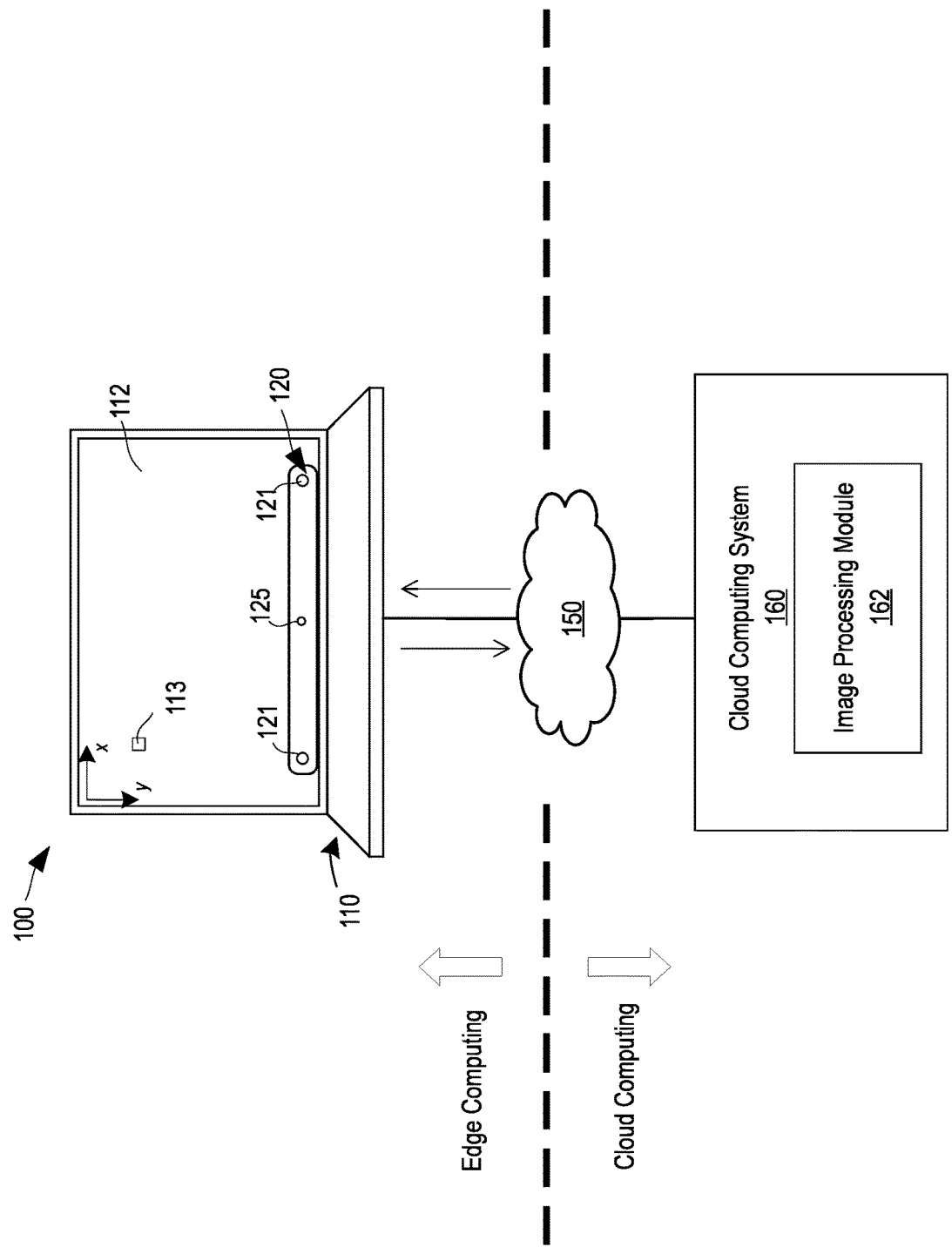

| | | |
|---|---|---|
| 9,241,044 B2 | 1/2016 | Shribman et al. |
| 9,274,597 B1* | 3/2016 | Karakotsios .......... G06F 3/0346 |
| 9,498,125 B2 | 11/2016 | Caraffi et al. |
| 9,557,568 B1* | 1/2017 | Ouderkirk .......... G02B 27/0081 |
| 9,612,656 B2 | 4/2017 | Sztuk et al. |
| 9,710,973 B2 | 7/2017 | Bar-Zeev et al. |
| 9,733,703 B2 | 8/2017 | Sullivan |
| 9,806,219 B2 | 10/2017 | Benson et al. |
| 9,898,866 B2 | 2/2018 | Fuchs et al. |
| 9,996,150 B2 | 6/2018 | Swaminathan et al. |
| 10,016,130 B2 | 7/2018 | Ganesan et al. |
| 10,061,383 B1 | 8/2018 | Ludusan |
| 10,108,260 B2 | 10/2018 | Park et al. |
| 10,157,313 B1 | 12/2018 | Zhang et al. |
| 10,217,286 B1* | 2/2019 | Angel ...................... G06F 3/013 |
| 10,338,644 B2 | 7/2019 | Jung et al. |
| 10,402,649 B2 | 9/2019 | Rabinovich et al. |
| 10,445,881 B2 | 10/2019 | Spizhevoy et al. |
| 10,459,481 B2 | 10/2019 | Pantel |
| 10,466,484 B1* | 11/2019 | Yoon ...................... H04N 13/332 |
| 10,466,779 B1* | 11/2019 | Liu ...................... G02B 27/0093 |
| 10,502,963 B1* | 12/2019 | Noble ................ B29D 11/0073 |
| 10,521,661 B2 | 12/2019 | Chen et al. |
| 10,534,982 B2 | 1/2020 | Linden |
| 10,558,332 B2 | 2/2020 | Lo |
| 10,594,974 B2 | 3/2020 | Ivarsson et al. |
| 10,599,280 B2 | 3/2020 | Caras et al. |
| 10,636,158 B1 | 4/2020 | Kamiyama et al. |
| 10,719,951 B2 | 7/2020 | Kaehler et al. |
| 10,755,128 B2 | 8/2020 | Turkelson et al. |
| 10,957,069 B2 | 3/2021 | Skogö |
| 10,963,718 B2 | 3/2021 | Shiota et al. |
| 10,976,814 B2 | 4/2021 | Aleem et al. |
| 10,999,226 B2 | 5/2021 | Cohen |
| 11,025,918 B2 | 6/2021 | Chen et al. |
| 11,132,543 B2 | 9/2021 | Ranjan et al. |
| 11,176,367 B1* | 11/2021 | Fix .......................... G06T 7/521 |
| 2008/0143820 A1* | 6/2008 | Peterson ................ G06T 11/60 348/E7.001 |
| 2008/0212942 A1* | 9/2008 | Gordon .............. H04N 21/4334 348/E7.071 |
| 2009/0196460 A1* | 8/2009 | Jakobs .................... G06V 40/19 382/103 |
| 2011/0234750 A1* | 9/2011 | Lai .......................... G03B 37/04 348/E7.001 |
| 2012/0249957 A1* | 10/2012 | Shibata ................ A61B 3/0025 351/206 |
| 2012/0250980 A1* | 10/2012 | Gillard ................... H04N 19/46 382/173 |
| 2012/0254369 A1* | 10/2012 | Gillard ................ H04N 21/4756 709/219 |
| 2012/0257005 A1* | 10/2012 | Browne ............... G02B 27/017 348/E7.001 |
| 2013/0182066 A1* | 7/2013 | Ishimoto ................ E02F 9/261 348/38 |
| 2013/0293488 A1 | 11/2013 | Na et al. |
| 2014/0037213 A1* | 2/2014 | Niederberger .......... G06T 11/00 382/195 |
| 2014/0049452 A1* | 2/2014 | Maltz ................... G02B 27/017 345/8 |
| 2015/0223684 A1 | 8/2015 | Hinton |
| 2015/0227735 A1 | 8/2015 | Chappell |
| 2016/0029883 A1* | 2/2016 | Cox ........................ G06V 40/19 351/209 |
| 2016/0085300 A1* | 3/2016 | Robbins .................. G06F 3/013 345/633 |
| 2016/0106315 A1 | 4/2016 | Kempinski |
| 2016/0241892 A1* | 8/2016 | Cole ........................ G06T 15/04 |
| 2016/0262685 A1 | 9/2016 | Wagner et al. |
| 2016/0342205 A1* | 11/2016 | Shigeta ................ G06V 10/147 |
| 2018/0046859 A1* | 2/2018 | Jarvenpaa ............... H04N 23/56 |
| 2018/0275409 A1* | 9/2018 | Gao ........................ G06T 19/006 |
| 2018/0307048 A1* | 10/2018 | Alexander ............... G03H 1/26 |
| 2019/0086674 A1* | 3/2019 | Sinay .................... G02B 27/283 |
| 2019/0312973 A1 | 10/2019 | Engelke et al. |
| 2019/0324532 A1 | 10/2019 | Aleem et al. |
| 2019/0364492 A1 | 11/2019 | Azizi et al. |
| 2020/0104589 A1 | 4/2020 | Sengelaub et al. |
| 2020/0110271 A1 | 4/2020 | Komogortsev et al. |
| 2020/0134868 A1 | 4/2020 | Liu et al. |
| 2020/0183174 A1* | 6/2020 | Noui ........................ G06F 3/013 |
| 2020/0368616 A1* | 11/2020 | Delamont ............... G06F 3/011 |
| 2020/0387217 A1 | 12/2020 | Chappell et al. |
| 2021/0011284 A1* | 1/2021 | Andreev ............ G02B 27/0179 |
| 2021/0041948 A1* | 2/2021 | Berkner-Cieslicki ........................ G06F 3/011 |
| 2022/0197376 A1* | 6/2022 | Boyle ...................... G06F 3/013 |
| 2022/0382064 A1* | 12/2022 | Rohn ...................... G02B 1/002 |
| 2022/0394234 A1* | 12/2022 | Etigson ................... G02B 30/10 |
| 2022/0397956 A1* | 12/2022 | Lundell ................... G06F 3/013 |
| 2022/0413302 A1* | 12/2022 | Meitav ............... G02B 27/0093 |
| 2022/0413603 A1* | 12/2022 | Held ................... G02B 27/0093 |

OTHER PUBLICATIONS

Brandic et al. Addressing Application Latency Requirements through Edge Scheduling. J Grid Computing 17, 677-698 (2019). https://doi.org/10.1007/s10723-019-09493-z.*

International Preliminary Report on Patentability, PCT/US2020/045149, dated Feb. 17, 2022, 5pgs.

International Search Report, PCT/US20/36524, dated Sep. 3, 2020, 2pgs.

Written Opinion, PCT/US20/36524, dated Sep. 3, 2020, 20pgs.

Xuan Li et al, "An Efficient Robust Eye Localization by Learning the Convolution Distribution Using Eye Template", Computational Intelligence and Neuroscience, Oct. 2015, vol. 2015, 21pgs.

* cited by examiner

SYSTEMS AND METHODS FOR HYBRID EDGE/CLOUD PROCESSING OF EYE-TRACKING IMAGE DATA

TECHNICAL FIELD

The present invention relates, generally, to eye-tracking systems and methods and, more particularly, to the processing of image data produced via such systems.

BACKGROUND

Eye-tracking systems—such as those used in conjunction with desktop computers, laptops, tablets, virtual reality headsets, and other computing devices that include a display—generally include one or more illuminators configured to direct infrared light to the user's eyes and an image sensor that captures the images for further processing. By determining the relative locations of the user's pupils and the corneal reflections produced by the illuminators, the eye-tracking system can accurately predict the user's gaze point on the display.

The processing of image data frames typically requires significant processing power on the edge computing device itself, which tends to increase the cost of device hardware. While in some contexts it might be advantageous to perform image processing using cloud computing, the network capabilities (e.g., latency and bandwidth) can reduce the responsiveness and overall user experience in such contexts.

Accordingly, there is a long-felt need for systems and methods for efficiently processing eye tracking data and using edge processing and/or cloud processing as appropriate. Systems and methods are therefore needed that overcome these and other limitations of the prior art.

SUMMARY OF THE INVENTION

Various embodiments of the present invention relate to systems and methods for, inter alia, intelligently switching between cloud processing mode and edge processing mode based on a variety of criteria, such as the desired eye-tracker settings (e.g., minimum tracker rate, ideal tracker rate, and processing mode) and the available network capabilities (e.g., latency, bandwidth, and the like). In some embodiments, the criteria used for determining whether buffered cloud processing is viable include such parameters as upload bandwidth, tolerable processing delay, buffer drain rate, buffer fill rate, and maximum session duration. In accordance with one embodiment, cloud processing may be used instead of available edge processing in cases where there are tangible benefits to doing so, e.g., the cloud processing system provides added functionality, such as improved data analytics or the like.

BRIEF DESCRIPTION OF THE DRAWING FIGURES

Figure 2B:
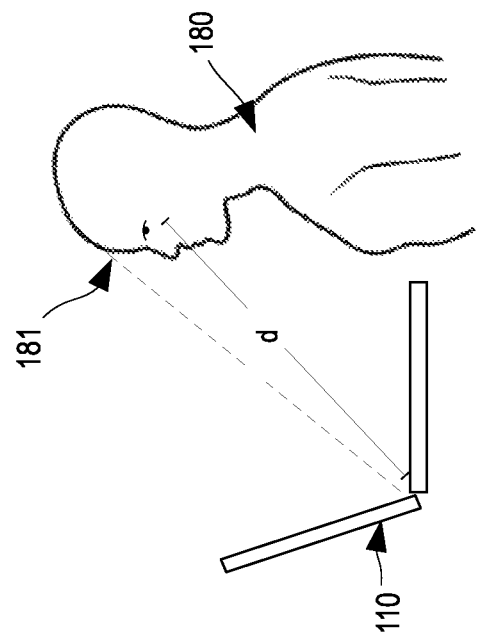
Figure 2A:
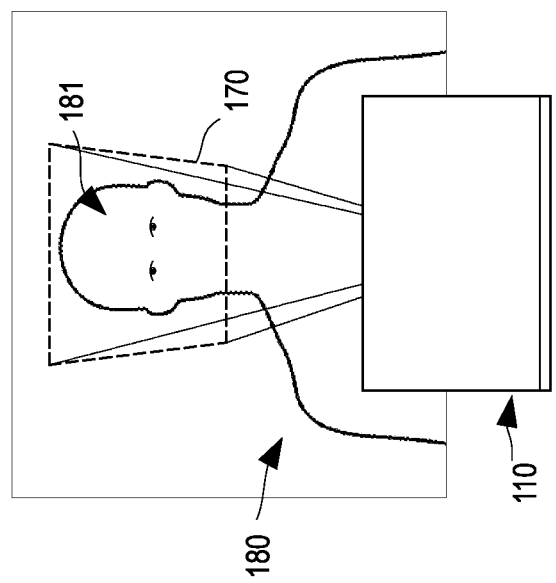
Figure 3:
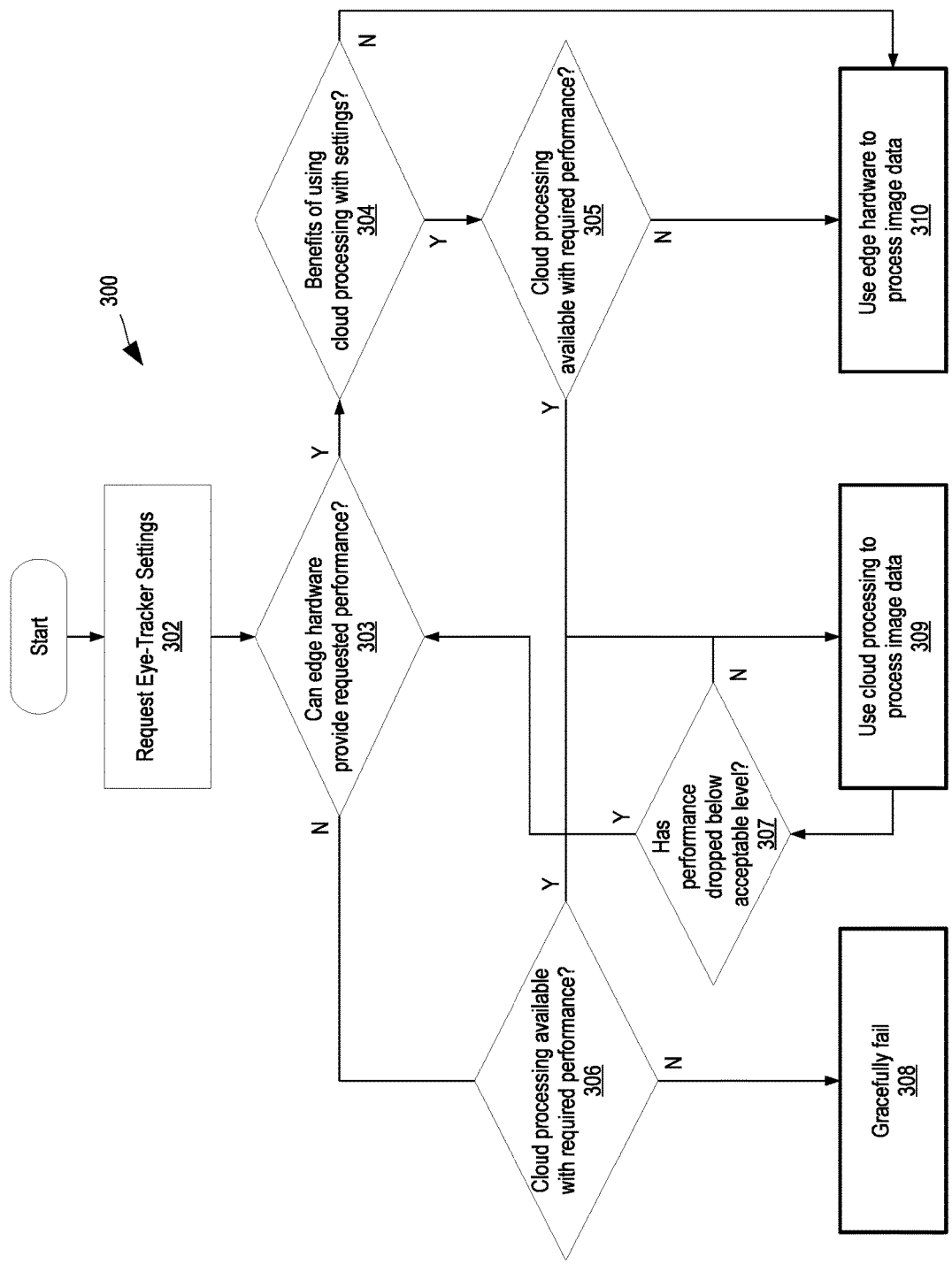

The present invention will hereinafter be described in conjunction with the appended drawing figures, wherein like numerals denote like elements, and:

FIG. 1 is a conceptual block diagram illustrating an eye-tracking system in accordance with various embodiments; and FIGS. 2A and 2B illustrate the use of an eye-tracking system in accordance with various embodiments; and FIG. 3 is a flowchart illustrating a hybrid edge/cloud process in accordance with various embodiments.

DETAILED DESCRIPTION OF PREFERRED EXEMPLARY EMBODIMENTS

The present subject matter generally relates to improved systems and methods for processing image data produced via eye tracking systems through a hybrid edge (local) and cloud (remote) process, in which the system determines the most desirable processing mode based on various network criteria and performance metrics (e.g., latency and/or bandwidth). In that regard, the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to eye-tracking algorithms, image sensors, machine learning systems, cloud computing resources, and digital image processing may not be described in detail herein.

Referring first to FIG. 1 in conjunction with FIGS. 2A and 2B, an eye-tracking system 100 useful in describing the present invention includes a suitable form of computing device 110 (e.g., a desktop computer, tablet computer, laptop, smart-phone, head-mounted display, television panels, dashboard-mounted automotive systems, or the like) having an eye-tracking assembly 120 coupled to, integrated into, or otherwise associated with device 310.

The eye-tracking assembly 120 is configured to observe the facial region 181 (FIGS. 2A and 2B) of a user within a field of view 170 and, through the techniques described herein, track the location and movement of the user's gaze (or "gaze point") 113, which may correspond to a location on a display (or "screen") 112 of computing device 110, as illustrated. The gaze point 113 may be characterized, for example, by a tuple (x, y) specifying linear coordinates (in pixels, centimeters, or other suitable unit) relative to an arbitrary reference point on display screen 112 (e.g., the upper left corner, as shown). The distance d of the user's facial region 181 from device 110 might also be measured. Similarly, the high speed movement of the user's pupil(s) may be sampled, in addition to the gaze itself.

In the illustrated embodiment, eye-tracking assembly 120 includes one or more infrared (IR) light emitting diodes (LEDs) 121 positioned to illuminate facial region 181 of user 180. Assembly 120 further includes one or more cameras 125 configured to acquire, at a suitable frame-rate, digital images ("eye-tracking image data," "eye images," or simply "images") corresponding to region 181 of the user's face. This image data may be stored in any convenient lossy or lossless image file format, such as JPG, GIF, PNG, TIFF, RAW, or any other format known in the art. In addition—particularly in the context of cloud tracking—various video compression techniques may be used. Suitable video coding formats include, for example, H.264, H.265, VP9, VP10, and/or machine learning based image compression tailored to eye-finding applications. Furthermore, the image data may be further compressed and/or partitioned into packets—with associated metadata—for transmittal over a network (e.g., network 150).

In some embodiments, the image data is analyzed locally—i.e., by a processing system located within computing device (or simply "device") 110 using a corresponding software client (referred to as "edge processing"). In some embodiments, however, processing of image data frames is accomplished using an image processing module (or "processing system") 162 that is remote from computing device 110—e.g., hosted within a cloud computing system 160 communicatively coupled to computing device 110 over a network 150 (referred to as "cloud processing").

During cloud processing, processing system 162 performs the computationally complex operations necessary to determine the gaze point from frames of image data and is then transmitted back (as eye and gaze data) over the network to computing device 110. An example cloud-based eye-tracking system that may employed in the context of the present invention may be found, for example, in U.S. patent application Ser. No. 16/434,830, entitled "Devices and Methods for Reducing Computational and Transmission Latencies in Cloud Based Eye Tracking Systems," filed Jun. 7, 2019, the contents of which are hereby incorporated by reference.

Referring now to FIG. 3, a hybrid edge/cloud processing method 300 will now be described. In general, the process begins at step 302, wherein the system requests, from the eye tracking module (e.g., 120 in FIG. 1) the desired eye-tracker settings. This request may be accomplished through any suitable API or the like provided by the eye-tracking module. The relevant settings may include, for example, minimum tracker rate (i.e., the minimum number of processed eye images per second that allows the software to behave as intended, potentially with noticeable but tolerable degraded performance), ideal tracker rate (i.e., the number of processed eye images per second to deliver ideal software performance), and processing mode (e.g., real-time or buffered). As just one example, the ideal tracker rate may be about 60 Hz, while the minimum tracker rate may be about 40 Hz.

"Real-time processing," as used herein, refers to a mode in which the system is processing eye images with a low enough latency between image capture and result that the user is provided with an interactive experience controlled by his or her eye gaze. For example, real-time processing is typically used with text communicators in which a non-verbal and/or mobility impaired individual gazes at cells containing words or letters to activate the cells and assemble messages that are then spoken aloud by the device's speakers.

"Buffered processing," in contrast, refers to a mode in which the system is capturing images at a relatively high rate (e.g., 120 Hz to 500+Hz) with most of the system's resources prioritized for capture speed. Once capture is complete—or possibly while capturing is taking place—the eye tracking images are processed with the intent of returning one or more results that are based on processing batches of the images. This processing mode is often used, for example, in diagnostic-style user experiences (e.g., an amblyopia screening tool or the like) in which real-time gaze feedback is not relevant to the user and/or not visualized in the user interface.

Next, at step 303, the system determines whether the edge hardware (i.e., device 110 and any associated hardware) can deliver the performance associated with the desired eye-tracker settings (e.g., the minimum tracker rate, ideal tracker rate, and processing mode). A variety of criteria may be used to make this determination, such as latency and bandwidth, as described in further detail below. In general, initial step 303 involves determining whether the edge device, unassisted by the cloud, can process eye images at speeds up to the static limit for real-time processing (e.g., 60 Hz) and up to a separate limit for buffered processing (e.g., 120 Hz). These limits are compared to the desired eye-tracker settings previously determined.

If it is determined that the edge hardware cannot provide the requested performance at step 303, the system determines, at step 306, whether a cloud processing system is available with the desired performance. If not, then the system "gracefully fails" 308—e.g., provides the user with a message to "try again shortly" or the like. If so, however, then the process continues to step 309, and the system uses cloud processing to process the image data.

Even if it is determined at step 303 that the hardware of device 110 is capable of providing the requested performance ("Y" branch at step 303), the system (at step 304) will determine whether there are benefits to using cloud processing. That is, in some contexts, the cloud processing system 162 may provide additional value through improved analytics, machine learning, or the like. If not, the system continues to step 310, and the edge hardware is used to process the image data.

Otherwise, if there are benefits to using cloud processing, the method continues to step 305 and the system determines whether the cloud processing system can provide the performance required by desired eye-tracking settings. In this regard, the application may set configuration flags at launch to convey whether it prefers the benefits of cloud processing when available. If so, then the system commences to process the image data using cloud processing (step 309). In general, cloud processing limited by how fast and how much data can be sent per second, as described in further detail below.

When the system is in cloud processing mode (step 309), the performance will continue to be monitored (e.g., by assessing latency, bandwidth, etc.) to determine whether the performance has dropped below some predetermined acceptable level (step 307). If so, then the system may loop back to decision block 303 and determine whether the edge hardware platform should be used for processing.

With respect to performance metrics, both the latency of the communication path (i.e., the round-trip time) and the bandwidth of the network (average sustainable data transfer rate) will be considered. If, for example, the latency (round-trip time) is less than some predetermined value (e.g., about 100 ms), then the responsiveness is sufficient for most applications to be used in real-time processing mode.

In one embodiment, the "required (upload) bandwidth" is defined as the minimum tracker rate (discussed above) multiplied by the size of the eye image packet (e.g., in bytes). If this value of the required bandwidth is less than the current (upload) bandwidth, then real-time cloud processing is viable.

Buffered cloud processing, on the other hand, is limited primarily by upload bandwidth, not latency. It is also limited by the available on-device storage allocated to the unprocessed eye image packets and how quickly the system can remove those packets to make room for more. Accordingly, the system defines a "maximum tolerable processing delay" based on the upload bandwidth, and then the required bandwidth can be computed as the minimum tracker size multiplied by the eye image packet size, all divided by the maximum tolerable processing delay.

The system also determines how quickly it can drain the buffer to arrive at a "maximum session duration." That is, the system defines a "buffer drain rate" as the upload bandwidth divided by the eye image packet size, then defines a "buffer fill rate" as the minimum tracker rate multiplied by the eye image packet size. The maximum session duration is then equal to the allocated storage divided by the difference between the buffer fill rate and the buffer drain rate. If the maximum session duration exceeds the duration set by the application, and the upload bandwidth exceeds the required upload bandwidth, then cloud processing in this mode is viable.

The above present just a few examples of the criteria that can be used by the system to select between cloud processing and edge processing paradigms, and are not intended to be limiting. In some embodiments, for example, the system provides a hybrid cloud-processing mode in which the two archetypical modes (real-time and buffered) are employed substantially simultaneously. The processing systems, modules, and other components described above may employ one or more machine learning or predictive analytics models to assist in carrying out their respective functions (i.e., with respect to bandwidth and latency criteria). In this regard, the phrase "machine learning" model is used without loss of generality to refer to any result of an analysis that is designed to make some form of prediction, such as predicting the state of a response variable, clustering, determining association rules, and performing anomaly detection. Thus, for example, the term "machine learning" refers to models that undergo supervised, unsupervised, semi-supervised, and/or reinforcement learning. Such models may perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

In summary, an eye-movement data acquisition system (and/or method) includes an illumination source configured to produce infrared light; a camera assembly configured to receive a portion of the infrared light reflected from a user's face during activation of the infrared illumination source and produce a plurality of image data frames; an edge processing system communicatively coupled to the camera assembly and the illumination sources, the edge processing system configured to produce eye-movement data based on the plurality of image data frames; a cloud processing system communicatively coupled to the camera assembly and the illumination sources, the cloud processing system configured to produce the eye-movement data based on the plurality of the image data frames; and a decision module configured to select between the edge processing system and the cloud processing system based on a set of desired tracker settings and a set of capabilities of the cloud processing system.

A method for acquiring eye-movement data includes producing infrared light with an illumination source; receiving, with a camera assembly, a portion of the infrared light reflected from a user's face during activation of the infrared illumination source and produce a plurality of image data frames; providing an edge processing system communicatively coupled to the camera assembly and the illumination sources, the edge processing system configured to produce eye-movement data based on the plurality of image data frames; providing a cloud processing system communicatively coupled to the camera assembly and the illumination sources, the cloud processing system configured to produce eye-movement data based on the plurality of image data frames; selecting between the edge processing system and the cloud processing system based on a set of desired tracker settings and a set of capabilities of the cloud processing system; and transmitting the image data frames to the selected processing system and producing the eye-movement data therewith.

A decision module for use in connection with an eye-movement data acquisition system of the type comprising an illumination source configured to produce infrared light, a camera assembly configured to receive a portion of the infrared light reflected from a user's face during activation of the infrared illumination source and produce a plurality of image data frames, includes: a processor configured to communicate with an edge processing system and a cloud processing system, wherein the edge processing system and the cloud processing system are each configured to produce eye-movement data based on the plurality of image data frames; the processor further configured to select between the edge processing system and the cloud processing system for processing of the image data frames based on a set of desired tracker settings and a set of capabilities of the cloud processing system.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), virtual machines, electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:
1. An eye-movement data acquisition system comprising:
an illumination source configured to produce infrared light;
a camera assembly configured to receive a portion of the infrared light reflected from a user's face during activation of the infrared illumination source and produce a plurality of image data frames;
an edge processing system communicatively coupled to the camera assembly and the illumination sources, the edge processing system configured to produce eye-movement data based on the plurality of image data frames;
a cloud processing system communicatively coupled to the camera assembly and the illumination sources, the cloud processing system configured to produce the eye-movement data based on the plurality of the image data frames; and a decision module configured to select between the edge processing system and the cloud processing system based on a set of desired tracker settings and a set of capabilities of the cloud processing system, wherein the set of capabilities includes at least a minimum tracker rate and a processing mode, the processing mode selected from the group consisting of real-time processing and buffered processing.

2. The system of claim 1, wherein the set of capabilities includes ideal tracker rate.

3. The system of claim 1, wherein the set of desired tracker settings includes network latency.

4. The system of claim 3, wherein the set of desired tracker settings includes network bandwidth.

5. The system of claim 1, wherein the decision module is configured to select the cloud processing system over the edge processing system if predetermined criteria are met, the predetermined criteria including at least improved analytics capabilities of the cloud processing system.

6. The system of claim 1, wherein the decision module enters a "gracefully failing" mode if neither the cloud processing system nor the edge processing system provides the desired tracker settings.

7. A method for acquiring eye-movement data, the method comprising:
Producing infrared light with an illumination source;
receiving, with a camera assembly, a portion of the infrared light reflected from a user's face during activation of the infrared illumination source and produce a plurality of image data frames;
providing an edge processing system communicatively coupled to the camera assembly and the illumination sources, the edge processing system configured to produce eye-movement data based on the plurality of image data frames;
providing a cloud processing system communicatively coupled to the camera assembly and the illumination sources, the cloud processing system configured to produce eye-movement data based on the plurality of image data frames;
selecting between the edge processing system and the cloud processing system based on a set of desired tracker settings and a set of capabilities of the cloud processing system, wherein the set of capabilities includes at least a minimum tracker rate and a processing mode, the processing mode selected from the group consisting of real-time processing and buffered processing; and
transmitting the image data frames to the selected processing system and producing the eye-movement data therewith.

8. The method of claim 7, wherein the set of capabilities includes ideal tracker rate.

9. The method of claim 7, wherein the set of desired tracker settings includes network latency.

10. The method of claim 9, wherein the set of desired tracker settings includes network bandwidth.

11. The method of claim 7, wherein the decision module is configured to select the cloud processing system over the edge processing system if predetermined criteria are met, the predetermined criteria including at least improved analytics capabilities of the cloud processing system.

12. The method of claim 7, wherein the decision module enters a "gracefully failing" mode if neither the cloud processing system nor the edge processing system provides the desired tracker settings.

13. A decision module for use in connection with an eye-movement data acquisition system of the type comprising an illumination source configured to produce infrared light, a camera assembly configured to receive a portion of the infrared light reflected from a user's face during activation of the infrared illumination source and produce a plurality of image data frames, the decision module comprising:
a processor configured to communicate with an edge processing system and a cloud processing system, wherein the edge processing system and the cloud processing system are each configured to produce eye-movement data based on the plurality of image data frames;
the processor further configured to select between the edge processing system and the cloud processing system for processing of the image data frames based on a set of desired tracker settings and a set of capabilities of the cloud processing system, wherein the set of capabilities includes at least a minimum tracker rate and a processing mode, the processing mode selected from the group consisting of real-time processing and buffered processing.

14. The decision module of claim 13, wherein the set of desired tracker settings includes network latency and network bandwidth.

15. The system of claim 1, wherein the decision module is configured to select the cloud processing system over the edge processing system if predetermined criteria are met, the predetermined criteria including at least improved analytics capabilities of the cloud processing system.

* * * * *